April 3, 1951  W. L. OLSON  2,547,883
RACK FOR AUTOMOBILE COWL PANELS
Filed July 30, 1948
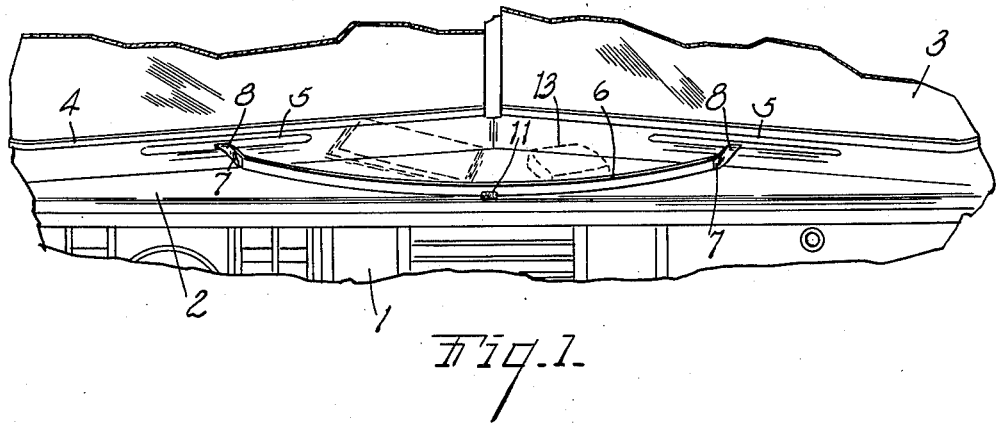
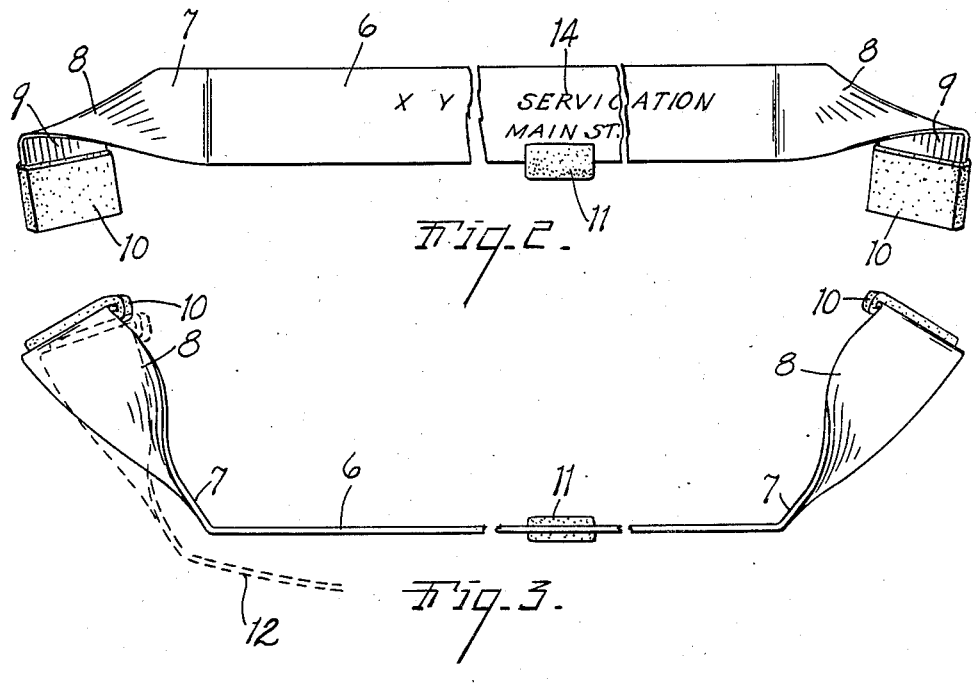
INVENTOR.
Willard L. Olson
BY
ATTORNEY.

Patented Apr. 3, 1951

2,547,883

UNITED STATES PATENT OFFICE 2,547,883

RACK FOR AUTOMOBILE COWL PANELS

Willard L. Olson, Battle Creek, Mich.

Application July 30, 1948, Serial No. 41,477

2 Claims. (Cl. 224—42.42)

This invention relates to improvements in racks for automobile cowl panels.

The principal objects of this invention are:

First, to provide a rack which is easily attached over the inner cowl panel of most automobiles for holding small objects within convenient reach of the occupants of the automobile.

Second, to provide a rack which is very inexpensive to manufacture and well adapted for carrying advertising material whereby the rack is useful as a premium or article to be given away by various business establishments.

Third, to provide a rack which is attachable to the inner cowl of an automobile without the use of tools and which will not rattle when in place.

Further objects and advantages of my invention will be apparent from a consideration of the following description and attached drawings. The invention is further pointed out in the claims.

The drawings, of which there is one sheet, illustrate a preferred form of my rack.

Fig. 1 is a fragmentary inside elevational view of the inner cowl panel of an automobile with my rack in place thereon.

Fig. 2 is a fragmentary front elevational view of the rack.

Fig. 3 is a fragmentary plan view of the rack.

Virtually all modern automobiles are provided with an instrument panel similar to that indicated at 1, the upper edge of which is connected to the generally horizontally extending inner cowl panel 2. The cowl panel extends forwardly to the windshield 3 and in the case of a divided V-shaped windshield there is a substantial shelf area provided on the cowl panel within the windshield. The windshield 3 is normally retained in place by a molding 4 and either the cowl panel or the molding is provided with a pair of slots or louvers 5, through which warm air may be discharged from a suitable heater for defrosting the windshield.

It is my purpose to provide a rack which is easily attachable over the cowl 2 to provide a fence for retaining small articles on the cowl where they can be easily reached by the occupants of the automobile. To this end I have provided an elongated strip 6 of relatively rigid but bendable and flexible material. The strip can be made of light gauge metal or thermoplastic materials, as desired. The ends of the strip are bent forwardly at an angle to the center of the strip as indicated at 7 and the forwardly bent ends are then twisted as at 8 until they lie in two slightly upwardly converging planes forwardly of the plane of the center of the strip and the bent portions 7. The ends of the twisted portions are then turned downwardly as at 9 approximately at right angles to the twisted portions 8 to form tips which are easily inserted in the defroster slots 5 as shown in Fig. 1.

Preferably the tips are provided with rubber or other soft covering 10 and a small cushioning bumper 11 is provided on the lower edge of the center of the strip to engage the cowl panel 2.

As is most clearly shown in Fig. 3, the downturned tips 9 lie in intersecting, generally vertical planes which converge at a slightly sharper angle than the angle of the two halves of the windshield 3. In installing the rack in an automobile the ends of the strip are drawn together bowing the center of the strip as indicated by the dotted lines at 12 in Fig. 3, until the downturned tips are parallel to and can be inserted in the defroster slots 5. The yielding springable character of the strip then causes the tips 9 to frictionally engage the inside of the defroster slots so that the rack is securely held in bowed position over the cowl 2. The stressed condition of the rack and the rubber coverings 10 and 11 effectively prevent the rack from rattling and the rack is effective to hold small articles as indicated by the dotted lines at 13 in Fig. 1.

No tools are required to install the rack and it is almost universally adaptable to all modern automobiles having the defroster slots 5. The degree to which the rack is bowed can be varied to suit the individual user or the width of the cowl panel 2. The flat strips 6 are easily printed with advertising indicia as indicated at 14 before the ends of the strip are folded and the inexpensive character of the rack permits it to be used as an advertising medium by automobile service stations and other business establishments.

Having thus described my invention what I claim as new and desire to secure by Letters Patent is:

1. A rack adapted to be installed in the defroster slots and inner cowl panel of an automobile comprising, an elongated narrow strip of springable and bendable material, the ends of said strip being bent at an angle to the center of said strip, the ends of said bent portions being twisted into upwardly sloping converging planes, the ends of said twisted portions being turned downwardly at approximately ninety degrees to said twisted portions, rubber pads positioned around said downturned ends, and a rubber bumper secured to the lower edge of the center of said strip.

2. A rack adapted to be installed over the cowl panel of an automobile comprising an elongated narrow strip of springable and bendable material, the ends of said strip being bent at an angle to the center of said strip, the ends of said bent portions being twisted into upwardly sloping converging planes, the ends of said twisted portions being turned downwardly from said twisted portions, and cushioning elements positioned around said downturned ends.

WILLARD L. OLSON.

REFERENCES CITED

The following references are of record in the file of this patent:

UNITED STATES PATENTS

| Number | Name | Date |
| --- | --- | --- |
| 1,732,520 | Leatherman | Oct. 22, 1929 |
| 1,920,393 | Joy | Aug. 1, 1933 |
| 1,958,266 | De Foe et al. | May 8, 1934 |
| 2,048,105 | Cobbs | July 21, 1936 |
| 2,299,025 | McGinley | Oct. 13, 1942 |
| D. 152,475 | Hueter | Jan. 25, 1949 |

FOREIGN PATENTS

| Number | Country | Date |
| --- | --- | --- |
| 434,898 | Great Britain | Sept. 11, 1935 |